US008706468B2

(12) United States Patent
Mucklow

(10) Patent No.: US 8,706,468 B2
(45) Date of Patent: Apr. 22, 2014

(54) METHOD AND PROGRAM PRODUCT FOR VALIDATION OF CIRCUIT MODELS FOR PHASE CONNECTIVITY

(75) Inventor: Blaine Madison Mucklow, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 13/237,679

(22) Filed: Sep. 20, 2011

(65) Prior Publication Data

US 2013/0073274 A1 Mar. 21, 2013

(51) Int. Cl.
*G06F 17/50* (2006.01)
(52) U.S. Cl.
USPC .............................................. 703/14; 703/13
(58) Field of Classification Search
USPC .......................................................... 703/14
See application file for complete search history.

(56) References Cited

U.S. PATENT DOCUMENTS

| 5,604,892 | A  | * | 2/1997 | Nuttall et al. ................... 703/18 |
| 6,516,326 | B1 | * | 2/2003 | Goodrich et al. ............. 707/602 |
| 7,895,156 | B2 |   | 2/2011 | Bracha et al. |
| 2012/0259611 | A1 | * | 10/2012 | San Andres et al. ............ 703/18 |

OTHER PUBLICATIONS

Wang et al. ("Development of Three-phase Distribution Power Flow Using Common Information Model", IEEE, 2000, pp. 2320-2325).*
Wang et al. ("CIM Extensions to Electrical Distribution and CIM XML for the IEEE Radial Test Feeders", IEEE, 2003, pp. 1021-1028).*
Alan W. McMorran ("An Introduction to IEC 61970-301 & 61968-11: The Common Information Model", University of Strathclyde Glasgow, UK, 2007, pp. 1-42).*
Bertran et al. ("On the Validation and Analysis of a New Method for Power Network Connectivity Determination", IEEE,1982, pp. 316-324).*
Castillo et al. ("Branch Parameters Validation for State Estimation Purpose ", IEEE, 2008, pp. 1-6).*
Robert K. Moniot ("Binary and Hex How to count like a computer" artcle in Google, published 2004).*
Wikipedia definition, "Web-Based Enterprise Management", Search date: Aug. 23, 2011, http://en.wikipedia.org/wiki/Web-Based_Enterprise_Management (5 pages total).
Wikipedia definition, "Common Information Model (computing)", Search date: Aug. 18, 2011, http://en.wikipedia.org/wiki/Common_Information_Model_computing). (3 pages total).

* cited by examiner

*Primary Examiner* — Omar Fernandez Rivas
*Assistant Examiner* — Iftekhar Khan
(74) *Attorney, Agent, or Firm* — Nixon & Vanderhye, P.C.

(57) ABSTRACT

Circuit component connectivity evaluation and validation method provides comparing and validating the correctness of electrical phase connectivity at connection nodes between conducting components within a circuit model of a power distribution network or other circuit. Phase connectivity requirements of each connected component/device/equipment in a particular circuit are obtained from a Common Interface Model (CIM) file containing parameter data describing the circuit. XML data strings obtained from the CIM file are parsed into enumerated data objects representing each component's phase connectivity requirements and assigned unique four bit binary phase connectivity mask values indicative of the particular electrical phase connectivity requirements of each component. Associated mask values corresponding to connection nodes between pairs of connected components are bit-wise logically "AND"ed and the result compared to each component's bit mask to validate that each connected component in the circuit is a correct phase type match with other components to which it is connected.

10 Claims, 6 Drawing Sheets

"Passed" Phase Connectivity Validation Example

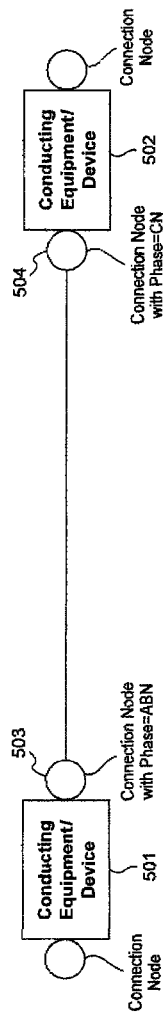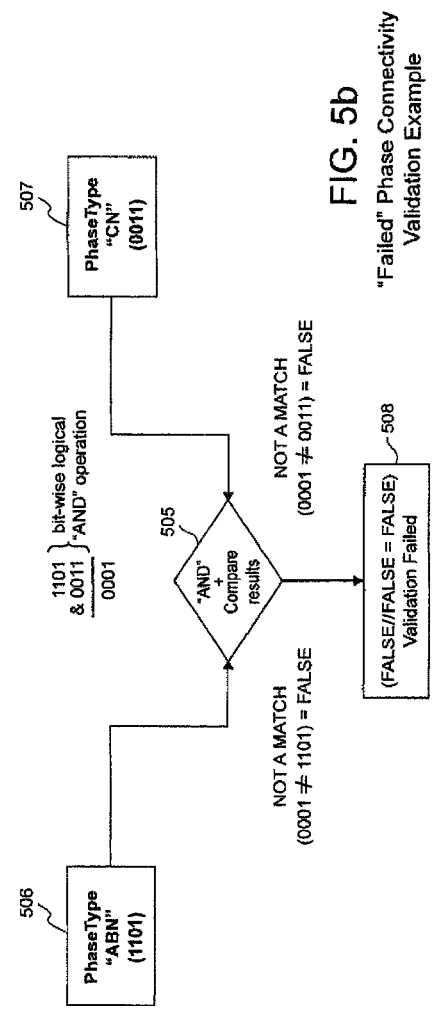

METHOD AND PROGRAM PRODUCT FOR VALIDATION OF CIRCUIT MODELS FOR PHASE CONNECTIVITY

The technology disclosed herein relates generally to validating component-to-component connections within a circuit network model for correct phase connectivity. More specifically, the disclosed technology relates to a method and program product for use, for example, by a version model management/exchange system or the like to provide the system with a capability for rapidly evaluating the phase connectivity and validating the connections of various electrical components/devices from an electrical circuit model before the circuit model data is passed on to network engineers/operators for real world implementation.

BACKGROUND

In general, the field of power engineering deals with the generation, transmission and distribution of electricity as well as the design and maintenance of a range of related equipment and components. Such equipment and components may include devices such as, for example, transformers, electric generators, electric motors and power electronics. For the most part, power engineering is concerned with the network of interconnected components which convert different forms of energy to electrical energy. Although, power systems engineering more specifically deals with the generation, transmission and distribution of electric power and the electrical devices used for such including generators, motors and transformers, much of the field is primarily concerned with the problems in dealing with three-phase AC power—the conventional standard form of electrical power for most large-scale power transmission and distribution across the modern world. Power engineers generally strive to design transmission and distribution networks which will transport electrical energy as efficiently as feasible, while at the same time taking into account economic factors, network safety and redundancy.

Modern power engineering typically involves three main subsystems: the power generation subsystem, the transmission subsystem, and the distribution subsystem. In the power generation subsystem, the power plant produces the electricity. The transmission subsystem transmits the electricity to specific load distribution centers. The distribution subsystem then completes the transmission of power to customers through a more localized distribution of the electricity. These networks typically comprise components such as power lines, cables, circuit breakers, switches and transformers. Typically, the transmission network is administered on a regional basis by an entity such as a regional transmission organization or transmission system operator.

Electric power transmission or "high-voltage electric transmission" is conventionally defined as the bulk transfer of electrical energy, from generating power plants to substations located near population centers. This is generally distinguished from the local wiring between high-voltage substations and customers, which is typically referred to as electric power distribution. Transmission lines, when interconnected with each other, become high-voltage transmission networks. These transmission networks are typically referred to as "power grids" or just "the grid". An electrical power transmission grid is a network of power stations, transmission circuits, and substations. Conventionally, energy is usually transmitted within a power grid using three-phase alternating current (AC) electric power. Typically, the power grid is an electrical network that connects a variety of electric generators to the users of AC electric power. Users purchase electricity from the grid avoiding the costly exercise of having to generate their own. Power engineers may work on the design and maintenance of the power grid as well as the power systems that connect to it. Such power systems are often referred to as "on-grid" power systems and may supply the grid with additional power, draw power from the grid or do both.

Conventionally, there are three main forms of generated and distributed electrical power: three-phase alternating current, two-phase alternating current and single-phase alternating current. Three-phase alternating current electrical power is a common form of electrical power that is used in power generation, transmission, and distribution. It is a type of polyphase electrical power that is commonly used in most electrical power grids worldwide to transfer power. Three-phase alternating current is also commonly used to power large motors and run other industrial equipment which may demand huge current loads. Three-phase electrical power circuits typically occur in two varieties: in one circuit type, there are only three energized ("hot") wires and, in the other type, there are three hot wires plus a neutral wire. Four-wire circuits offer a certain degree of flexibility, since a load may be connected "line-to-line" or "line-to-neutral". Three-wire circuits offer economy, since the neutral conductor is eliminated. Commonly, distribution voltage circuits are four-wire, whereas higher voltage transmission circuits are three-wire.

Two-phase alternating current electric power, like three-phase, provides a constant power transfer to a linear load. For loads that connect each phase to neutral, assuming the load is the same power draw, the two-wire system has a neutral current which is greater than neutral current in a three-phase system. In contrast, single-phase alternating current electric power conventionally refers to the distribution of alternating current electric power using a system in which all the voltages of the supply vary in unison. Single-phase distribution is typically used where electrical loads are mostly due to lighting and heating, with few large electric motors. Single-phase loads may be connected to a three-phase system in two basic ways: either a load may be connected across two of the live conductors, or a load can be connected from a live phase conductor to the neutral conductor. Single-phase loads, however, must be distributed evenly between the phases of the three-phase system for the most efficient use of the supply transformer and supply conductors. If the line-to-neutral voltage is a standard load voltage, for example 230 volt on a 400 volt three-phase system, single-phase loads can connect to a phase and the neutral. Loads may also be distributed over three phases to balance the load.

With a contemporary electrical power transmission/distribution network, or any distributed services provider having geographically distributed facilities such as telecom and utility companies, it is practically a necessity to have a communications network for distributing and exchanging information between design engineers, system operators and field maintenance personnel, among others. For example, among other things, there is typically a constant need for the communication and exchange of engineering data and documentation such as, among other things, initial electrical circuit design models and subsequent component changes and upgrades. Typically, this is accomplished through the use of distributed computer systems and equipment connected via either private or public communications networks such as the Internet.

In a non-limiting example implementation of such a communications network, a Model Managing/Model Exchange system or platform (MEP) may be provided to more efficiently handle tasks such as, among others, managing, accessing documenting and distributing engineering specifications/models, including circuit models and model version changes, among other things, between authoring/publishing entities and end-user/subscriber entities or system operators who may be responsible for the implementing, monitoring, checking and operating of the modeled circuitry or hardware.

Industrial electrical equipment and power transmission/distribution companies typically may have many different pieces of electrically powered machinery and equipment, as well as, a variety of electrical conducting devices and components which may be used in numerous circuits and electrical equipment networks. Commonly, these circuits can comprise many connection points, and the connection points between each constituent piece of equipment, conducting device/component must be first evaluated and validated for proper phase connectivity/compatibility prior to power-up and use of the circuit or network. In the past, phase connectivity validation of circuit components/equipment had to be performed manually by an operator/engineer in the field prior to implementing actual changes in circuit/equipment hardware. Unfortunately, it is not really possible to have a person or persons quickly and efficiently evaluate and validate the correctness of electrical phase connectivity at connection nodes between conducting components in an engineering circuit model where there may be numerous components and potentially hundreds or thousands of connection nodes to evaluate and validate, nor is it practical or even feasible. One solution to this problem is to use computerized assistance. However, evaluating and validating connection points between every component/device for such circuits can become a very time consuming process even when such evaluating and validation is performed using computer-implemented aids. For example, conventional attempts at computerized evaluation and validation of electrical components in circuit models for phase connectivity involved using software comprising a large block of 'if-then' instructions and performing many string comparisons, which was computationally inefficient and very time consuming. However, in a network information and communications system when distributing circuit model information and model changes obtained from a design/publication source, to be practical, it is desirable to be able to quickly identify phase validation errors in a circuit model before passing that circuit model along to engineers/operators in the field. Consequently, it was not feasible to perform computerized phase connectivity evaluation and validation within a network communications system, even if the network employed a MEP/model manager system/platform, because conventional computer implementations would have taken too long to be of any practical use for most situations and applications.

Therefore, a need exists for a fast and efficient computerized tool for performing evaluation and validation of model circuit component connectivity within a communications network system. As a practical solution to this problem in the art, the non-limiting example implementation disclosed herein provides a MEP/Model Manager computer system/platform that has fast and efficient model circuit component connectivity evaluation and validation capabilities. More particularly, in the non-limiting example implementation disclosed herein, a method and program product is described for enabling a MEP/model manager computer system/platform, or the like, to quickly and efficiently evaluate and validate the correctness of electrical phase connectivity at connection nodes between conducting components/devices within a particular circuit network model of a power distribution network or other electrical equipment circuit network without hindering performance of other information management and distribution functions. The non-limiting example implementation also enables a quick detection and identification of phase connectivity errors in a circuit model by a model manager computer system/platform before the model is passed along to an end-user/consumer so that the turnaround time required to inform the model source/publisher of the existence of an error and then obtain a correction to publish/send can be significantly decreased. In addition, the non-limiting example method and program product implementation described herein provides certain commercial advantages for an MEP/model manager computer system/platform, or the like, in that it allows at least basic evaluations and validations to be performed on a circuit model before passing it to the end-user/consumer.

BRIEF DESCRIPTION

An illustrative non-limiting example method and program product for evaluating electrical phase connectivity of electrical components/devices/equipment and validating the connections of components comprising a particular electrical circuit specification/model or portion thereof is described herein. More specifically, a non-limiting example implementation described herein provides a fast and an efficient component phase connectivity evaluation and connection validation process for use, for example, by an MEP/Model Manager system as part of a communications network for an electrical power transmission/distribution company.

The illustrative non-limiting example computer process and program product for providing circuit component connectivity evaluation and validation disclosed herein serves as a useful and practical tool for quickly and efficiently evaluating and validating the correctness of electrical phase connectivity at connection nodes between conducting components, devices or equipment within a particular circuit network model of a power distribution network or other electrical equipment circuit models. In one non-limiting example implementation, the electrical phase connectivity requirements of each connected component/device/equipment (hereinafter 'components') in a particular electrical circuit network or portion thereof are obtained from a Common Interface Model (CIM) file containing parameter data describing the circuit network. Data strings obtained from the CIM file representing each component's phase connectivity requirements are converted to unique four bit binary phase connectivity mask values indicative of the electrical phase connectivity requirements of the component. Associated mask values corresponding to circuit connection nodes between pairs of connected components are bit-wise logically 'AND'ed and compared to determine and verify that each connected component in the circuit model is a correct or acceptable electrical phase connectivity match with other components to which it is connected.

Although the illustrative non-limiting example computer implementation of the phase connectivity evaluation and validation process described herein is generally applicable toward providing a fast and efficient tool for evaluating engineering models/specifications of various electrical circuits, systems and electrical equipment in a multitude of different engineering and commercial environments, the particular non-limiting implementation disclosed herein is presented by way of example for use as a tool by an MEP/model manager computer/server system. The example MEP/model manager computer/server system described herein may be configured as part of a private or public distributed communications network for providing, among other services, the publication, distribution and management of engineering model data for use, for example, by a commercial entity having distributed resources and customers.

BRIEF DESCRIPTION OF THE DRAWINGS

The block diagrams in the figures below do not necessarily represent an actual physical arrangement of the example system, but are primarily intended to illustrate major procedural aspects and method steps in convenient functional groupings so that the non-limiting illustrative exemplary implementation presented herein may be more readily understood. The above described features and other aspects and advantages will be better and more completely understood by referring to the following detailed description of exemplary non-limiting illustrative implementations in conjunction with the drawings of which:

FIG. 4b is a block diagram illustrating the disclosed non-limiting example phase connectivity validation process for the pair of electrical conducting components/devices of FIG. 4a;

FIG. 5a is a block diagram illustrating a second pair of electrical conducting components/devices and their respective connectivity node phase designations;

FIG. 5b is a block diagram illustrating the disclosed non-limiting example phase connectivity validation process for the pair of electrical conducting components/devices of FIG. 4b;

DETAILED DESCRIPTION

Figure 1:
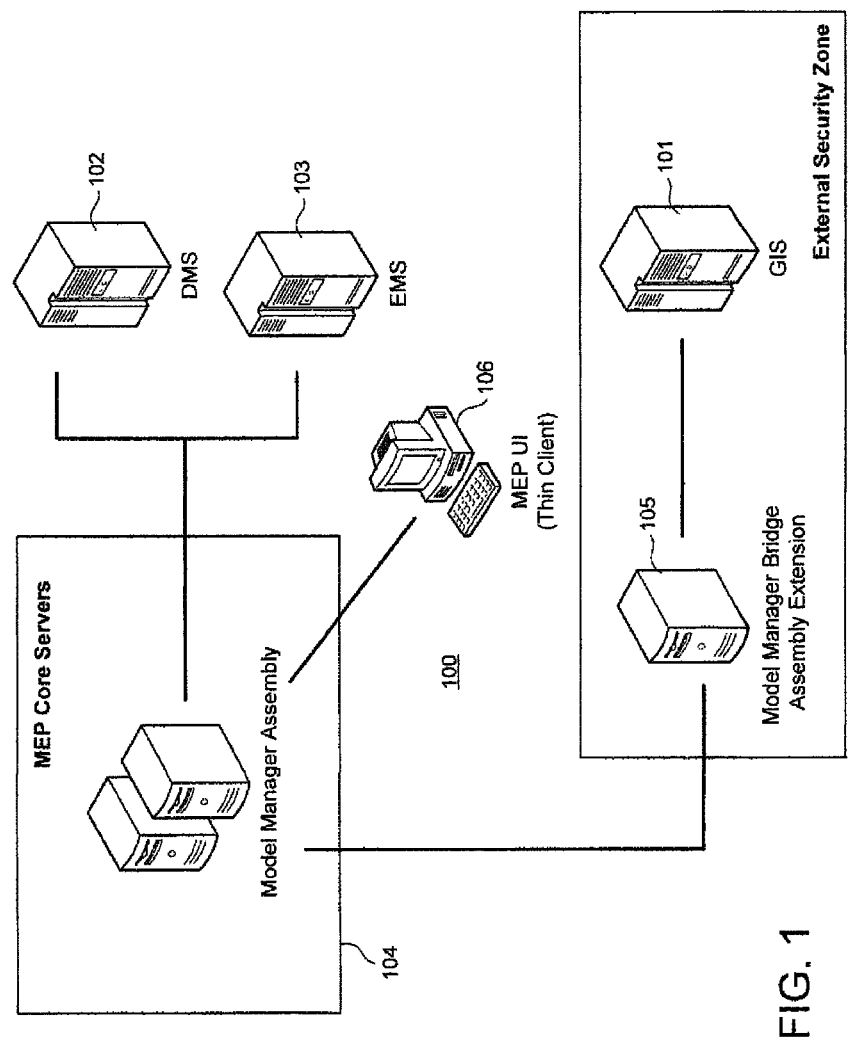
FIG. 1 is schematic diagram illustrating an example general overall physical architecture of a Model Exchange Platform/model manager system (MEP) by which the disclosed non-limiting illustrative example method for phase connectivity validation may be implemented.

FIG. 1 shows a high level block diagram of the overall physical architecture for an example systems engineering model data distribution and communications network arrangement. An information distribution network arrangement of this sort, indicated generally by numeral 100, conventionally comprises a number of independent and geographically distributed interconnected computer systems or network servers. Typically, as might be needed by a public utility company or an electrical power transmission/distribution company or other large company having geographically distributed facilities, an information distribution network of this sort might include, for example, at least some sort of engineering model data publisher or source, such as a geographical information system (GIS) 101, and have one or more engineering model data consumers or distributers, such as distribution management system (DMS) 102 and/or other enterprise management server (EMS) 103. A non-limiting hardware arrangement of such an example information distribution network, as generally illustrated in FIG. 1, may also include a Model Exchange Platform or Model Manager system/assembly (MEP) comprising one or more core servers for efficiently managing the notification, distribution and exchange of, among other things, systems engineering model data and notifications between entities across the network at numeral 104. Preferably, the MEP includes at least one server on which the non-limiting illustrative example method and program product for phase connectivity evaluation and validation disclosed herein below is implemented. One non-limiting example conventional hardware implementation of the MEP would comprise a pair of servers each having, for example, a 2.66 GHz quadcore processor, 20 GB or more of ECC SRAM with 4×146 GB of internal hard disk space, Raid controllers and redundant network cards and power supplies (conventional hardware configuration not illustrated herein). An example information distribution network for a utility or power transmission/distribution company, such as illustrated in FIG. 1, might also include other computing and communication handling elements or servers such as an MEP Bridge Extension server 105 for traversing external security zones, a thin client MEP user interface (UI) computer 106 and connections to one or more other EMS 103.

Figure 2:
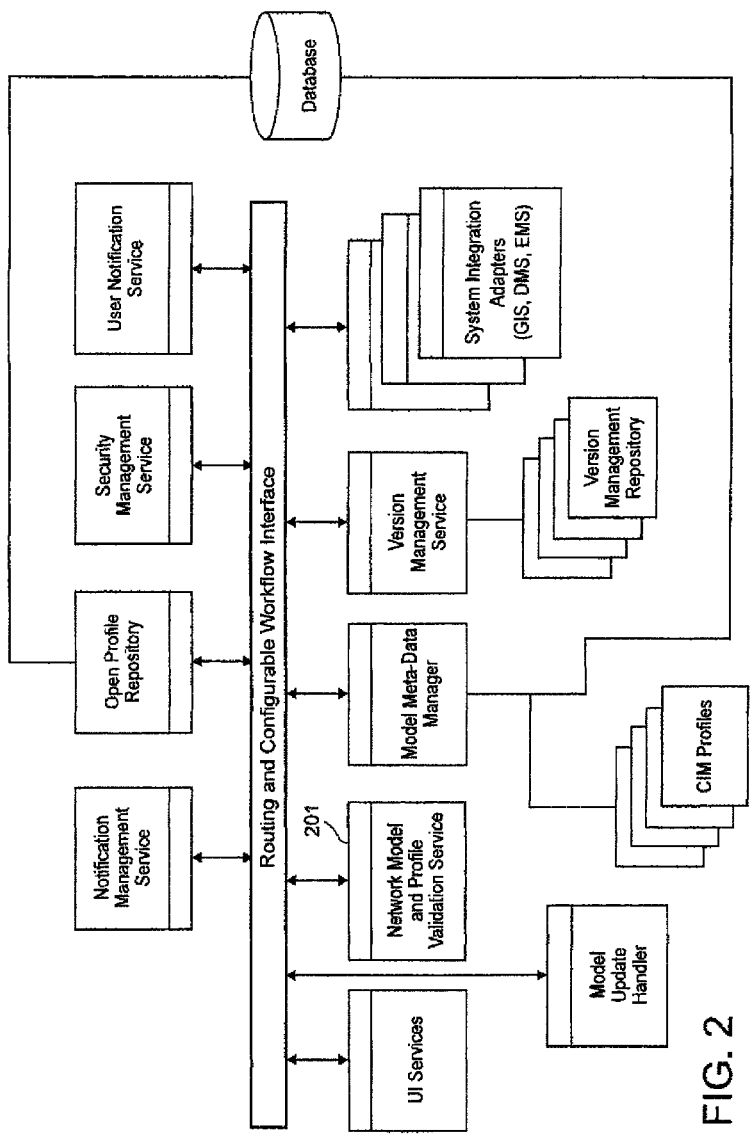
FIG. 2 is block diagram illustrating an overall general conceptual architecture of a MEP by which the disclosed non-limiting illustrative example method for phase connectivity validation may be implemented.

In FIG. 2, a functional block diagram illustrates a non-limiting illustrative example conceptual architecture for a Model Manager/Exchange Platform (MEP) as employed in the information distribution and management system of FIG. 1. In this particular non-limiting example, the MEP server core 104 (FIG. 1) is contemplated as providing a variety of information handling and distribution services including user interface services, model update handling, model and profile validation services, model meta-data management services, model version management and repository services, notification management, open profile repository services, security certificate management, email and SMS text user notification services and, in addition, provides database storage and integration adapters for GIS. DMS and EMS systems, as indicated by the respective functional blocks shown in FIG. 2. In particular, a Network Model and Profile Validation Service, generally indicated at functional block 201, is contemplated to provide specific checking, verification and validation of engineering models, design specification profiles and the like that are distributed or exchanged between various authoring and end-user entities connected to the network. The model/profile validation service functions 201 provided by the MEP is just one example of a contemplated environment for implementing the non-limiting illustrative example method and program product for circuit component phase connectivity evaluation and validation disclosed herein below.

Figure 3:
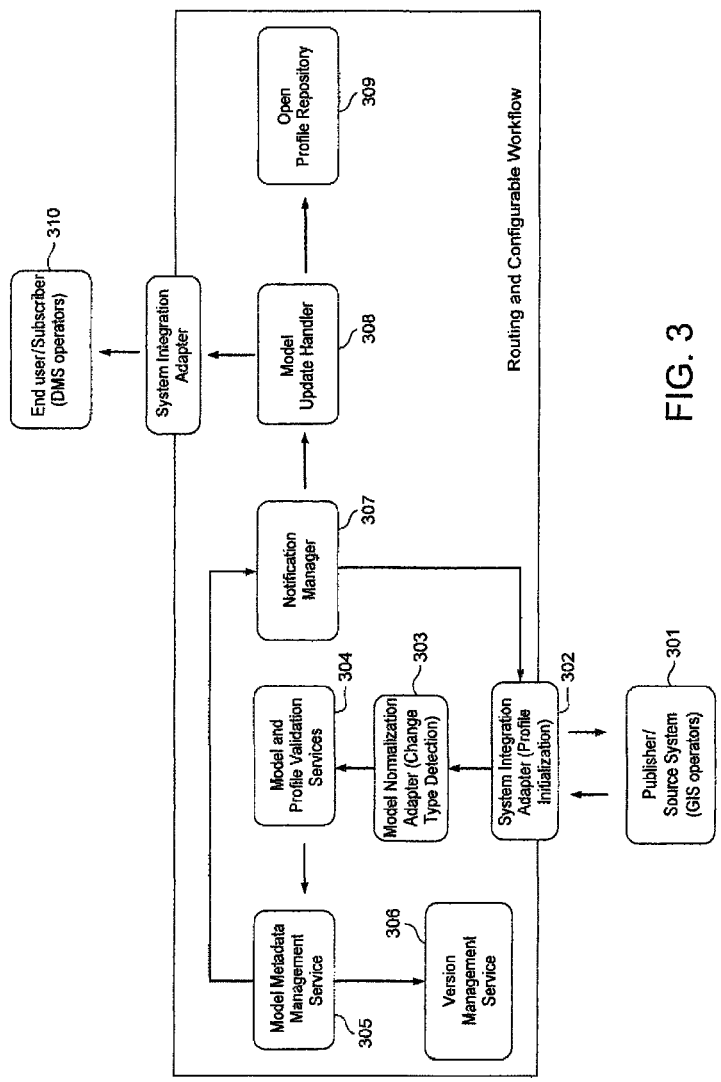
FIG. 3 is an example process flow diagram of a MEP model data synchronization process by which the disclosed non-limiting illustrative example method for phase connectivity validation may be implemented.

FIG. 3 shows a non-limiting illustrative example process flow diagram for a model data and information synchronization process which may be implemented by a model manager system such as MEP 104 of FIG. 1. In general, a publishing entity 301 produces an initial or incremental data information load, for example, in the form of a conventional CIM-XML file, GML file or both. In the example of a CIM file, the data may be assembled using CIM-XML formatting which is a commonly known protocol conventionally used for sending CIM messages on top of HTTP. The file is provided to the MEP and the engineering/circuit model specification information contained therein may be read out as strings of XML data. A system integration adapter 302 detects the profile of the specific file type/system and adds metadata to the published message/information/model indicating the profile type. A model normalization adapter 303 then determines if the information is of a specific type, e.g., an initial load, an incremental update of either CIM, GML or both. Next, a series of services represented by Model Profile and Validation Services block 304 performs various checks of the distributed information and engineering model data including performing both phase connectivity evaluations and validating component connections of circuit models. A model validation service process, such as the example process indicated at functional block 304, embodies the non-limiting illustrative example process for circuit component phase connectivity evaluation and validation disclosed herein below. Next, as illustrated in block 305, a model metadata management services process gets metadata associated with the incoming transaction and stores the information in a database (not shown). The information may be versioned by a version management service 306 and notifications concerning the transaction are sent out by a notification management service 307. A model update handler 308 sends the information to an open profile repository and also sends a proper profiled response to an end user/subscriber 310. Acceptance or rejection of network changes by the distribution management system (DMS) results in notification to all subscribing systems of an accepted change or rejection message. Accordingly, engineering model changes/updates among other information, may be efficiently managed, versioned, archived, distributed and timely made available to appropriate users/subscribers of such information, such as, in the case of a power distribution company, grid operators, field engineers, service technicians and the like.

In a non-limiting example implementation of the phase connectivity evaluation and validation process disclosed herein, different binary bit mask values are assigned for each of the different enumerated phase connectivity types possible at a connection node of a conducting component in a circuit model. In this non-limiting example, there are sixteen different possible phase connectivity types which are enumerated as indicated in Table 1 below. Alternatively, as shown in Table 1, each phase connectivity type may be identified by a decimal integer value. As also illustrated in Table 1, each possible phase connectivity type for a conducting component in a circuit model is uniquely enumerated and each enumeration is assigned a corresponding unique four bit binary mask number.

TABLE 1

| Phase Type | Mask |
| --- | --- |
| Not Used (0) | 0000 |
| N (1) | 0001 |
| C (2) | 0010 |
| CN (3) | 0011 |
| B (4) | 0100 |
| BN (5) | 0101 |
| BC (6) | 0110 |
| BCN (7) | 0111 |
| A (8) | 1000 |
| AN (9) | 1001 |
| AC (10) | 1010 |
| CAN (11) | 1011 |
| AB (12) | 1100 |
| ABN (13) | 1101 |
| ABC (14) | 1110 |
| ABCN (15) | 1111 |

Effectively, the bit mask arrangements of Table 1 are based upon the assignment of a separate binary bit location to each of the three different possible types of AC electrical phase present in a circuit, enumerated here as A, B and C, as well as one bit location assigned for neutral or ground, enumerated here as N, thus enabling a unique binary mask representation for all of the possible different phase connectivity types of components. For example:

$$
\begin{array}{cccc}
A & B & C & N \\
1 & 1 & 1 & 1 \quad = 1111 \\
2^3 + & 2^2 + & 2^1 + & 2^0 \quad = 8+4+2+1=15
\end{array}
$$

Figure 4A:
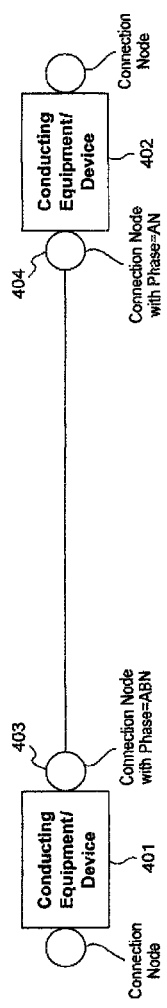
FIG. 4a is a block diagram illustrating a first pair of electrical conducting components/devices and their respective connectivity node phase designations.

Referring now to FIG. 4a, a block diagram is used to generally illustrate an example pair of conducting electrical components/devices and their respective connection node phase connectivity designations as may be specified by component parameter data for a particular circuit model provided, for example, in a CIM-XML file. In this first example, a pair of connected components 401 and 402 of a particular circuit is specified by the circuit model parameter data as having respective associated connection nodes 403 and 404 of different phase connectivity characteristics. More specifically, for this example, component 401 is specified as having a connection node 403 designated as an 'ABN' phase connectivity type and that component 401 is connected to component 402 which is specified as having a connection node 404 designated as an 'AN' phase connectivity type. Consequently, in order to validate this connection between components 401 and 402, the connection of node 403 to node 404 must first be evaluated to determine if the connection between an 'ABN' phase connectivity type component and an 'AN' phase connectivity type component is a compatible/permissible connection.

Figure 4B:
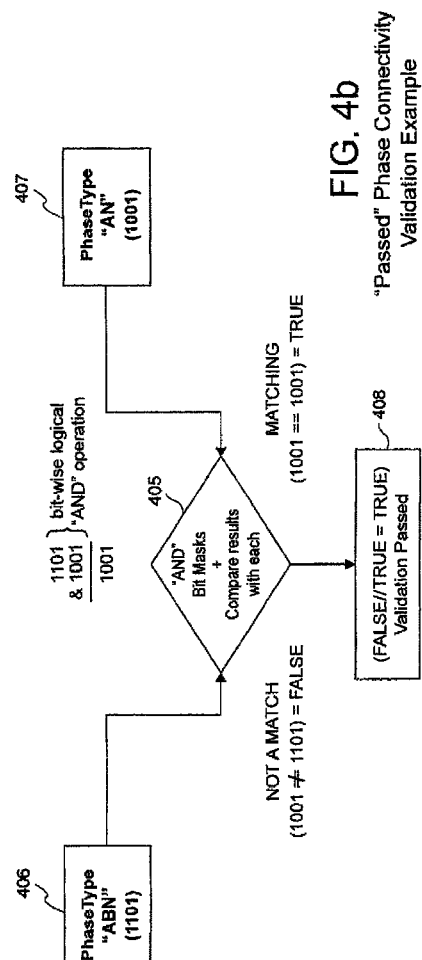

Next in FIG. 4b, a functional block diagram is shown which effectively illustrates the basic phase connectivity evaluation and validation process used for evaluating the connection between components 401 and 402 via their respective connection nodes 403 and 404. At the outset, a unique binary phase-type connectivity mask value is assigned to each of the different possible electrical phase connection types, for example, as enumerated in Table 1. In this example, component 401 has a phase connectivity type of "ABN" and has an assigned a bit mask value of "1101" (block 406). Similarly, a second component 402 has a phase connectivity type of "AN" and has an assigned a bit mask value of "1001" (block 407). As illustrated, a bit-wise logical "AND" operation is performed between the two respective phase connectivity bit mask values. If the logical operation result matches the bit mask value of either connection node 403 or connection 404, then the two connection nodes are deemed to be of compatible phase connectivity and the connection between the two nodes is given a passing validation. Conversely, if neither comparison results in a match, then the phase connectivity between the two nodes is considered as not being electrically connectable. In this example, the logical operation result, in this case "1001", does not match the bit mask value "1101" for the "ABN" type component node (block 406), however, it does match the bit mask value "1001" for the "AN" type component node (block 407). Consequently, the connection between the two nodes is given a "passed" validation (block 408) in this case.

In FIG. 5a, a second example pair of conducting electrical components/devices is illustrated along with their respective connection node phase connectivity designations. In this second example, a pair of connected components 501 and 502 of a particular circuit is specified by the circuit model parameter data as having respective associated connection nodes 503 and 504 of different phase connectivity characteristics. Specifically, in this second example, component 501 is specified as having a connection node 503 designated as an 'ABN' phase connectivity type and that component 501 is connected to component 502 which is specified as having a connection node 504 designated as an 'CN' phase connectivity type. Consequently, in order to validate this connection between components 501 and 502, the connection of node 503 to node 504 must first be evaluated to determine if the connection between an 'ABN' phase connectivity type component and a 'CN' phase connectivity type component is a compatible/ permissible connection.

Next in FIG. 5b, a functional block diagram is shown which effectively illustrates the basic phase connectivity evaluation and validation process used for evaluating the connection between components 501 and 502 via their respective connection nodes 503 and 504. In this second example, a component 501 has a phase connectivity type of "ABN" and is assigned (from Table 1) a bit mask value of "1101" (block 506). A second component 502 has a phase connectivity type of "CN" and is assigned (from Table 1) a bit mask value of "1001" (block 507). As illustrated, a bit-wise logical "AND" operation is performed between the two respective phase connectivity bit mask values. If the logical operation result matches either bit mask value, then the two connection nodes are deemed to be of compatible phase connectivity and the connection between the two nodes is given a passing validation. Conversely, if neither comparison results in a match, then the phase connectivity between the two nodes is considered as not being electrically connectable. In this example, since the logical operation result, in this case "0001", does not match either the bit mask value "1101" for the "ABN" type component node (block 506) or the bit mask value "0011" for the "ABN" type component node (block 507), the connection between the two nodes is given a "failed" validation (block 508). Consequently, in this case, a "failed" validation error notice or message may need to be generated referencing that particular circuit connection.

Figure 6:
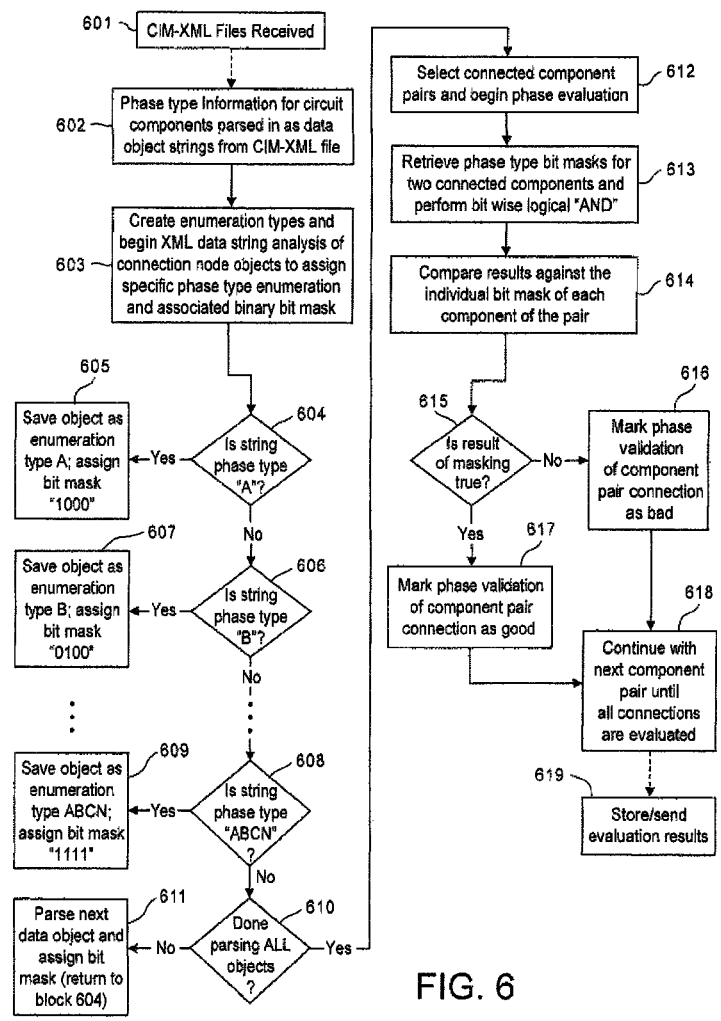
FIG. 6 is a process flow diagram illustrating non-limiting example processing operations which may be executed by a digital computer/processor for implementing component phase connectivity validation in a circuit model component connection evaluation process.

Referring now to FIG. 6, a process flow diagram illustrates a set of non-limiting example processing operations which may be executed by a digital computer/processor or network server of an MEP/model manager system to provide fast and efficient circuit model component connection evaluation and validation. Initially, as indicated at blocks 601 and 602, a CIM-XML file containing circuit specifications/model data is received over the communications network by an MEP/ model manager system from an authoring producer/source (not shown) and appropriate circuit information, such as constituent component and connection node object specifications, is parsed into strings of XML data. At block 603, each of the different phase connectivity types possible in a circuit model are given different enumerations and assigned specific corresponding binary bit masks (e.g., see Table 1 above). At blocks 604 through 609, comparison operations are performed on XML data strings for connection node data objects of the circuit components to label each connection node with the appropriate phase connectivity type enumeration and assign to it the associated bit mask. For example, at decision block 604, a connection node data XML string indicating the phase connectivity type of a particular node is examined to determine if it is of the phase type "A". If so, a connection node data object is created, labeled as a type "A" phase connectivity node, assigned the associated binary bit mask of "1000" and saved, as indicated at block 605. If it is determined that the XML string data is not the "A" phase connectivity type, then it is next examined to determine if it is of a second type. For example, at decision block 606, the phase indicative XML data string for the node is next examined to determine if it is of the phase type "B". If this turns out to be true, a connection node data object is created and labeled as a type "B" phase connectivity node and assigned the associated binary bit mask of "0100" and that information is saved, as indicated at block 607. If it turns out that the XML string data is not a "B" phase connectivity type, the data string is next examined to determine if it is of yet a another phase type, and so on. As indicated by the flow diagram ellipsis leading from block 606 to block 608 and block 609, this phase type determination and bit mask assignment process continues until the particular connection node XML data string has been identified as one of the possible different phase connectivity types and is assigned the appropriate associated bit mask as indicated in Table 1. After this process is finished for one connection node, XML data string from the CIM-XML file for a particular circuit model are parsed is parsed for another connection node data object and the above processing repeats until all connection node data objects in the CIM-XML file have been parsed, as indicated by blocks 610 and 611.

Next, once all of the connectivity node data objects for a particular circuit model are parsed, pairs of connected component are selected, as indicated at block 612, and operations for evaluation and validation of connected component pairs begins. As indicated at block 613, assigned phase connectivity bit masks for a first pair of connected components are first retrieved and then a logical 'AND' operation is performed between the two bit mask values. Next, as indicated at block 614, the result of the logical 'AND' operation between the two bit mask values is separately compared against the individual bit mask for each component of the pair. If, as determined in block 615, the result of either comparison is true (i.e., the binary value of the logical 'AND' result and the binary value of either bit mask are a match), then the phase validation is indicated as good (block 617), however, if the result of the comparison does not yield at least one matching value, then the phase validation is considered as bad (block 616). As indicated at block 618, the operations for evaluating and validating connected component pairs described in blocks 612 through 617 is repeated for each pair of connected components of the circuit model until all connections of the circuit model are evaluated. As indicated at block 619, the evaluation/validation results, including "passed validation" or "failed validation" notifications or messages for particular circuit connections, may then be stored and/or delivered via the network to interested user/subscribers.

As described above, an implementation of the method disclosed herein may be in the form of computer-implemented process and/or program product for practicing those processes. An implementation may also be practiced or embodied in the form of computer program code containing instructions embodied in tangible media, such as floppy diskettes, CD ROMs, hard drives, or any other computer-readable storage medium, wherein when the computer program code is read and executed by a computer, the computer becomes an apparatus for practicing the disclosed process or method. An implementation may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is read and/or executed by a computer, the computer becomes an apparatus for practicing the disclosed process or method. When implemented on a general-purpose programmable microprocessor or computer, the computer program code configures the programmable microprocessor or computer to create specific logic circuits (i.e., programmed logic circuitry).

While disclosed method and apparatus is described with reference to one or more exemplary embodiments, it will be understood by those skilled in the art that various changes may be made and equivalence may be substituted for elements thereof without departing from the scope of the claims. In addition, many modifications may be made to the teachings herein to adapt to a particular situation without departing from the scope thereof. Therefore, it is intended that the claims not be limited to the specific embodiments disclosed, but rather include all embodiments falling within the scope of the intended claims. Moreover, the use of the terms first, second, etc. and indicia such as (i), (ii), etc. or (a), (b), (c) etc. within a claim does not denote any order of importance, but rather such terms are used solely to distinguish one claim element from another.

The above written description uses various examples to disclose exemplary implementations of the invention, including the best mode, and also to enable any person skilled in the art to practice the invention, including making and using any devices or systems and performing any incorporated methods. The patentable scope of the invention is defined by the claims which follow, and may include other examples that occur to those skilled in the art. While an exemplary implementation has been described herein in connection with what is presently considered to be the most practical and preferred embodiment, it is to be understood that the claimed invention is not to be limited to the disclosed example embodiments, but on the contrary, is intended to cover various modifications and equivalent arrangements included within the spirit and scope of the appended claims.

What is claimed is:

1. A method, implemented by a computer system having one or more processors and used for circuit model management/exchange between entities communicating over a network, for comparing and validating a phase connectivity of connected conducting electrical components in a circuit model, the method comprising:
   assigning a unique binary phase-type connectivity mask value to each of possible different phase connection types associated with conducting electrical components in a particular circuit or circuit portion;
   obtaining phase connectivity attribute data for a plurality of components of the circuit or circuit portion;
   assigning a corresponding phase-type connectivity mask value indicative of the electrical phase connectivity requirement for a first component based on obtained phase connectivity attribute data for said first circuit component;
   assigning a corresponding phase-type connectivity mask value indicative of the electrical phase connectivity requirement for a second component based on obtained phase connectivity attribute data for said second circuit component;
   evaluating and validating pairs of connected components in the circuit, using said one or more processors, by:
   i) performing a bit-wise logical 'AND' operation between assigned phase-type mask values of said first and second circuit components;
   ii) comparing a result of the logical 'AND' operation with each individual assigned phase-type mask value of both said first and second circuit components, wherein
   if either comparison results in a match, the phase connectivity between said first and said second component is validated and the first and the second component are identified as being electrically connectable; or conversely,
   if neither comparison results in a match, the phase connectivity between said first and said second component is not validated and the first and the second component are considered as not being electrically connectable;
   repeating operations (i) and (ii) above until all connections between connected components in the circuit model have been evaluated; and
   communicating said component validation results of an evaluated circuit model to one or more entities in said communications network.

2. The method of claim 1 wherein the phase-type connectivity mask is a four bit binary number.

3. The method of claim 1 wherein phase connectivity attribute data for a plurality of components comprise circuit model parameter data describing a particular circuit or circuit portion.

4. The method of claim 1 wherein phase connectivity attribute data for a plurality of components are obtained as one or more XML data strings from a CIM-XML file containing parameter data describing a particular circuit or circuit portion.

5. A computer system, including at least one computer processor, for providing engineering model management/exchange between entities communicating over a network and for evaluating and validating phase connectivity of connected conducting electrical components described in a circuit model, the computer system configured to function and/or perform operations comprising:
   assigning a unique four bit binary phase-type connectivity mask value to each of possible different phase connection types for conducting electrical components of the circuit model;
   obtaining phase connectivity data concerning a plurality of components of the circuit model from a data file containing parameter data describing the circuit model;
   assigning a phase-type connectivity mask value that is correspondingly indicative of electrical phase connectivity requirements of each of said plurality of circuit components based on the phase connectivity attribute data;
   performing a bit-wise logical 'AND' operation between assigned phase-type connectivity mask values of a pair of connected circuit components;
   comparing a result of the logical 'AND' operation with each individual assigned phase-type mask value of both circuit components of the pair, wherein if either comparison results in a match, the phase connectivity between the pair of components is validated and the pair of components are identified as being electrically connectable, and if neither comparison results in a match, the phase connectivity between said the pair of components is not validated and the pair of components are identified as not being electrically connectable;
   repeatedly performing said bit-wise logical 'AND' and result comparing operations above until all circuit connections between connected pair of components in a circuit model are evaluated; and
   communicating said component validation results of an evaluated circuit model to one or entities over said communications network.

6. The method of claim 5 wherein the phase-type connectivity mask is a four bit binary number.

7. The method of claim 5 wherein phase connectivity data for one or more components is read as one or more XML data strings from a CIM-XML circuit model file containing parameter data describing the circuit components.

8. A non-transitory computer-readable tangible storage medium embodying one or more sequences of computer-executable processing instructions which, when executed by one or more computer processors of a MEP/model manager system in an information exchange/communications network, causes the system to perform operations and/or functions of evaluating and validating phase connectivity for electrical components of a circuit model provided in a data file, the processing instructions comprising:

- a first sequence of instruction that assign a different unique binary phase-type connectivity mask value for each different possible phase connection type of conducting electrical component of a circuit model;
- a second sequence of instruction that read a string of phase connectivity attribute data for a plurality of components of the circuit from a data file containing parameter data describing the circuit model;
- a third sequence of instruction that assign a specific phase-type connectivity mask value to each of said plurality of circuit components based on the phase connectivity attribute data read fro the file, the assigned mask value being correspondingly indicative of a component's particular electrical phase connectivity requirements;
- a forth sequence of instruction that perform a bit-wise logical 'AND' operation between assigned phase-type connectivity mask values of a pair of connected circuit components;
- a fifth sequence of instruction that compare a result of the logical 'AND' operation with each individual assigned phase-type mask value of both circuit components of the pair, wherein
    if either comparison results in a match, the phase connectivity between the pair of components is validated and the pair of components are identified as being electrically connectable, and if neither comparison results in a match, the phase connectivity between said the pair of components is not validated and the pair of components are identified as not being electrically connectable; and
- instructions causing the system to repetitively perform said fourth and fifth sequence of instruction for pairs of connected circuit components specified in the circuit model data file until all connections between connected pairs of components are evaluated.

9. The medium of claim 8 wherein the phase-type connectivity mask is a four bit binary number.

10. The medium of claim 8 wherein phase connectivity data for one or more components is read as one or more XML data strings from a CIM-XML circuit model file containing parameter data describing the circuit components.

* * * * *